United States Patent [19]

Klein

[11] 4,286,977

[45] Sep. 1, 1981

[54] HIGH EFFICIENCY PARTICULATE AIR FILTER

[76] Inventor: Max Klein, 257 Riveredge Rd., Tinton Falls, N.J. 07724

[21] Appl. No.: 84,781

[22] Filed: Oct. 15, 1979

[51] Int. Cl.³ ............................................. B01D 39/14
[52] U.S. Cl. ...................................... 55/524; 55/528; 162/145; 162/156; 162/168 R; 162/169; 428/283; 428/288; 428/903; 428/297; 428/402; 428/407
[58] Field of Search ............... 428/220, 283, 288, 296, 428/297, 298, 299, 302, 303, 306, 903, 310, 402, 407; 162/145, 164 R, 168 R, 168 N, 169; 55/524, 528

[56] References Cited

U.S. PATENT DOCUMENTS

| | | | |
|---|---|---|---|
| 3,016,599 | 1/1962 | Perry | 428/903 |
| 4,182,649 | 1/1980 | Isgur et al. | 162/169 |

*Primary Examiner*—James J. Bell
*Attorney, Agent, or Firm*—Dann, Dorfman, Herrell & Skillman

[57] ABSTRACT

An air filtration mat formed from a mixture of certain proportions of glass micro-fibers, an intimate blend or cobeat of cellulose fibers and micro-bits of an expanded, non-brittle polystyrene, lower polyolefin, or flexible polyurethane, and an organic binding agent such as polyvinyl alcohol or aqueous acrylic or vinyl chloride polymer emulsions distributed uniformly throughout the glass micro-fibers and blend of cellulose fibers and micro-bits. The glass micro-fiber component is made up of an array of fibers having various dimensions, which are mixed in specific proportions. The filter mat may optionally contain fibers of a fiber-forming terephthalate polyester to enhance the wet strength of the web during processing.

11 Claims, No Drawings

HIGH EFFICIENCY PARTICULATE AIR FILTER

This invention is that of certain air filtration mats composed of a substantially uniform array of glass fibers (composed of a plurality of filaments) of varying submicron and low micron diameters and randomly intermixed with a so-called cobeat of cellulose fibers and micro-bits of any of an expanded, thermoplastic styrene-polymer or expanded lower polyolefin (from polyethylene to poly-methylpentene) and of a flexible foamed polyurethane, with each said polymer being non-brittle in its initial expanded form. The glass fibers and cobeat of cellulose and polymer micro-bits may be bonded together primarily at their intersections with a suitable compatible organic binder.

After the initiation of activity involving the production of the nuclear bomb and continuing recovery or uranium from its ores, considerable concern arose about the need for air pollution control of radio-active pollutants. For example, control of the emission of an undesirable concentration of plutonium-bearing particles from the nuclear bomb production and of entrained hydrofluoric acid particles from uranium recovery exhausted into the atmosphere developed a need for suitable air filters to reduce such pollutants to within tolerable concentrations.

Some filter mats made available to overcome the problem included in mixtures of glass fibers of varying diameters the code 104 glass fibers (having a diameter of from 0.34 to 0.48 microns) and an organic binder. In addition to the high cost of the 104 glass fibers such mats manifested other disadvantages in use such as inadequate tensile strength and breakage on folding or pleating as in the required fluted configuration in supporting such mats in the filter holding frames.

The air filter mats of this invention overcome the shortcomings and disadvantages of the heretofore available air filter mats for use against these nuclear pollutants and also meet the rigid specifications set by the United States military with enhanced performance. The primary items of these specifications are that:
(i) the filtration efficiency should be better than (i.e. should allow less than) 0.03% penetration through the mat of a smoke of 0.3 micron size dioctyl phthalate particles at a filtration resistance of less than 40 mm. differential pressure,
(ii) tensile strength of 0.4 kilo per centimeter (cm.) in the paper machine direction and 0.36 kilo per cm. in the cross (or transverse) direction; and
(iii) LOI (i.e. loss on ignition) should be less than 7%.
Loss on ignition is due to the organic binder content in the glass fibers matrix.

Considered broadly, the air filter mats of the invention are comprised of
(a) about 250 parts of glass micro-fibers composed of admixed together (i) about 50 parts of such fibers about 6300 microns long and about 4.3 microns in diameter (DE 636 fiberglass product of Owens-Corning Fiberglas Corp., New York, N.Y.), (ii) about 50 parts of such fibers (code 110, Johns Manville Products Corporation, New York, N.Y.) 1500 microns long and from about 2.17 to about 3.1 microns in diameter, and (iii) about 150 parts of such fibers (code 106, Johns Manville) about 1000 microns long and from about 0.49 to about 0.58 micron in diameter, all intertwined with (b) from about 9.35 to about ten parts of cobeat (described below) including (i) from about 4.68 to about 5 parts of cellulose fibers and from about 4.67 to about 5 parts of polymer micro-bits of an expanded styrene-polymer or polyolefin (each as more fully described below) or of flexible foam polyurethane, each said polymer being non-brittle in its initial expanded form;
which intertwined glass fibers and cobeat of cellulose fibers and polymer micro-bits are enhanced in holding together in sheet or elongated web form and permeable to a gaseous and/or vapor fluid stream by
(c) about 2 parts of an organic binding agent distributed substantially uniformly throughout the intermixture of the glass fibers and cobeat (primarily at their intersections) in an amount and manner sufficient to hold them together immobile as to one another and without destroying the air permeability of the mat. This organic binding agent is inert to the glass fibers, the cobeat of cellulose fibers and micro-bits and to any other mat constituent as well as to any gas or vapor or entrained droplets and fine particles that are to contact the mat and is selected from (i) such binder insoluble in cold water and soluble in hot water such as polyvinyl alcohol (particularly the cold water swellable 98% hydrolyzed product) and (ii) any of the aqueous acrylic emulsions and polyvinyl chloride emulsions used as binders (as by fusion at the fiber junctions) in glass fiber mats. Any of the just described organic binders can be replaced in part or as a whole by a binding equivalent amount of the cobeat of cellulose fibers and polymer micro-bits. Cobeat in (b) can total 12 parts without added binder.

The cobeat constituent of the mats of the invention is so-called because it is prepared as an aqueous suspension by beating together in, for example, a paper-making pulper paper type cellulose fibers, beneficially wet lap cotton fibers, and the above-mentioned polymer micro-bits.

The wet lap cotton fibers are those commonly used in writing paper making to provide its cotton rag content. They are prepared for the most part from cotton fabric cuttings and cotton linters which are washed (bleached if necessary) and separated (as in a hollander) into fibers of from about 4.23 mm. to about 1.27 cm. in length, fed to a wet lap machine and led from it as a web between pressure rolls and leave them as a web about 2.1 mm. thick (containing about 80% moisture) and then are lapped up and back over and over on a pallet usually to a pile of about 363.8 kilos gross weight. Other cellulose fibers suitable in paper making can be used.

Of the above referred to polymer micro-bits, the micro-bits of an expanded styrene-polymer or polyolefin are fully described in applicant's U.S. Pat. No. 4,207,378. The preparation of those styrene-polymer and polyolefin micro-bits is described in the same Patent.

The micro-bits of a flexible foam polyurethane are described in applicant's U.S. Pat. No. 4,200,679. The preparation of the foam polyurethane micro-bits is the same as that used in preparing the micro-bits of an expanded styrene-polymer and of an expanded polyolefin in applicant's U.S. Pat. No. 4,207,378.

All of the above referred to and identified parts of applicant's U.S. Pat. No. 4,200,679 and 4,207,378 are to be considered as incorporated herein by reference as if they appear in full herein.

The preparation of the cobeat of cellulose fiber and polymer micro-bits is illustrated by, but not restricted to, the following:

EXAMPLE 1

Preparation of Cellulose Fiber And Polymer Micro-Bits Cobeat

A cobeat suspension was prepared by (a) charging 181.8 kilos (dry basis) of wet lap cotton fibers (containing 727.2 liters of water in the fibers) and 181.8 kilos (dry basis) of polystyrene micro-bits (6% solids holding 2848.5 liters of bound water as received from the expanded polystyrene comminuter) into 13,354 liters of water in a pulper (as used in paper making) and (b) agitating the resulting mixture for 3 minutes by running the pulper rotor at 506 revolutions per minute (r.p.m.) thereby inter-working and intermingling the cotton cellulose fibers and polymer micro-bits as a uniform dispersion free of clumps and clusters in the water.

This initial cotton fibers and micro-bits dispersion was pumped to a (paper making) beater having its pressure roll set at 65% of maximum and run at 110 r.p.m. for 6 hours (when the freeness dropped to 600). The roll setting then was changed to provide more fibrillation and less cutting action, by using only the brush roll pressure with the roll barely contacting the bed. The desired end occurred in two hours when the freeness was found reduced to 450. The beater content (now the cobeat suspension) was retained in the beater under merely sufficient agitation for the dispersion to remain in suspension for later use. This is the desired cobeat dispersion.

The cobeat of this invention is not restricted to use of cotton fiber wet lap as its cellulose constituent for any other cellulose such as can be used in paper making can be used similarly in Example 1. So also, the polymer micro-bits used in preparing the cobeat of Example 1 are not restricted to the polystyrene micro-bits used in that example. Any other expanded styrene-polymer micro-bits or expanded polyolefin micro-bits or flexible foam polyurethane micro-bits can be used in equivalent amounts.

The styrene micro-bits used in this production of the cobeat were prepared from bit-pieces of clean expanded scrap polystyrene (as described in applicant's U.S. Pat. No. 4,207,378).

Accordingly, Example 1 is to be considered as re-run with its wet lap cotton fibers replaced by an equivalent amount of any other herein noted to be suitable cellulose fibers and also with the polystyrene micro-bits replaced by any other expanded styrene-polymer or expanded polyolefin micro-bits or foam polyurethane micro-bits, and to avoid making the application prolix each such so modified different example is to be considered as if it is written out in full herein.

A further embodiment of the invention includes the air filters of this invention prepared from the earlier above indicated mixture of the cobeat and the glass fibers [of the parts (a) and (b) of the invention as above broadly considered] with or without additional binder, by feeding a furnish composed of a diluted mixture of the cobeat and the glass fibers intertwined therein through a paper making operation including passage through a head box to the Fourdrinier and onto the usual series of dryer drums.

For some of the mats to enhance the wet strength of the web on passing from the Fourdrinier to the dryer drums it is beneficial to include suitable fibers of a fiber-forming terephthalate polyester. For that it is beneficial to prepare an intermediate supply suspension containing the preliminary cobeat dispersion with added fiber-forming terephthalate polyester, into which the glass fibers are to be admixed. Such intermediate supply suspension and its preparation is illustrated by, but not restricted to, the following:

EXAMPLE 2

Intermediate Supply Suspension With Polyester Fibers

In a vessel of suitable capacity, such as a beater chest, 189.3 liters of the cobeat dispersion of Example 1 were admixed into 30,280 liters of water thus providing a diluted cobeat dispersion, into which there was admixed 91 kilos of a readily water dispersible, fiber-forming terephthalate polyester, specifically semi-dull, optically whitened polyethylene terephthalate polyester (beneficially in 1.27 cm. long fibers of 1.5 denier spun by conventional melt process), having a special finish compatible with most anionic, cationic or nonionic binders (and providing rapid and excellent dispersion with a wide variety of furnish systems and additives), and solution viscosity of $770\pm20$ of $\frac{1}{2}$ gram dissolved in 50 ml. of solvent (by weight, 40 parts to tetrachloroethane and 60 parts phenol) at 25° C. (solution viscosity is the viscosity of the polymer solution divided by the viscosity of the solvent, with the result minus one multiplied by 1000); melting point 48.67° C., non-shrinkable in boiling water, and elongation at break 45% (available as TREVIRA 101, product of American Hoechst Corporation, Fibers Division, Spartenburg, South Carolina 29301).

This specific polyethylene terephthalate polyester may be referred to briefly as the readily water dispersible, semi-dull, optically whitened polyethylene terephthalate polyester having a special finish compatible with anionic, cationic or nonionic binders and non-shrinkable in boiling water.

This intermediate supply suspension with polyester fibers need not be restricted to use of the specific polyester used in Example 2, for it can be replaced by any other fiber-forming terephthalatepolyester (in any of the available 1.5 and 3 denier diameters) such as some other fiber-forming polyethylene terephthalate polyester or methyl 1,4-cyclohexane dimethanol terephthalate.

Thus, Example 2 and the additional similar examples resulting from such substitution of each of these other fiber-forming terephthalate polyesters are to be considered as if presented herein written out in full with the specific polyester of Example 2 separately respectively replaced by each one of these other applicable fiber-forming terephthalate polyesters.

For some of the applications that need to follow certain government regulations, the specifications for the mats require that there be included in the furnish, suitably in the initial aqueous mixture of the cellulose fibers and the polymer micro-bits, a water dispersible cationic organic water repellant inert to the constituents of the mat and ineffective to its necessary porosity and tensile strength, and in an amount sufficient at least to provide a practical degree of water repellance. By that is meant in an amount to give adequate water repellance without unnecessary excess of the repellant.

The applicable water repellants are examplified by, but not restricted to, the cationic perfluoroalkyl (from 6 to 10 carbons in the alkyl chain) acrylate copolymer suitably used in aqueous dispersion, i.e. as a latex, containing about 20% of the repellant substance which also is effective as a fire repellant.

The air filtration mats of the invention and their preparation is illustrated by, but not restricted to, the following examples:

EXAMPLE 3

Minimum Constituent Air Filter

Into 11,355 liters of water in a pulper there are admixed in sequence 2.27 kilos (dry basis) of the cobeat of equal parts by weight of cotton fibers and polystyrene micro-bits, 4.54 kilos of sodium hexametaphosphate and 1.9 liters of the usual concentrated sulfuric acid and the mixing continued to dissolve the hexametaphosphate and provide a uniform suspension, which required 2 minutes.

To that slurry (having a pH of about 3) in the pulper there was admixed 22.7 kilos of the DE 636 glass fibers (about 6.35 mm. long). The mixing was continued to provide a uniform dispersion of the glass fibers and cobeat in about 10 minutes. Then to allow further use of the pulper that mixture was transferred to a beater chest and agitated there merely sufficiently to maintain the glass fibers and cobeat in suspension.

Into another 11,355 liters of water in the pulper there was admixed 3.18 kilos (dry basis) of the same cobeat with the mixing continued to provide a uniform suspension in a couple of minutes. Then there was admixed into that slurry in the pulper 22.7 kilos of the code 110 glass micro-fibers and 68.1 kilos of the code 106 glass micro-fibers and the mixing continued to provide a uniform suspension. The second slurry of micro-bits and glass micro-fibers was also transferred to the beater chest and admixed with the slurry already in it.

7600 liters of (rinse) water then were added to the pulper and agitated to suspend any glass fibers and/or cobeat which settled out and remained behind while the initial pulper mix was being pumped to the beater chest. The resulting so-called pulper rinse mix then was pumped to the beater chest and there admixed into the prior combined pulper mix. Then there was admixed into this resulting slurry in the beater chest (or on the slurry transfer to the machine chest) the smaller amount of water needed to provide the starting mat-making mix containing 0.5% solids.

This starting mat-making mix then was pumped to the machine chest (also a supply holding chest) with its contents maintained under agitation also as in the beater chest. From this supply chest the mat-making mix was fed to the furnish box for the Fourdrinier at a rate of 4.32 kg. solids per minute and there combined with clear dilution water at a rate of 6056 liters per minute (LPM).

The resulting uniform web-furnish slurry (as diluted in the furnish box) was fed onto the traveling Fourdrinier screen (86 strands in the machine direction and 60 strands across) moving at a rate of 15.24 meters per minute (i.e. MPM) to enable providing an initial web mat which after later finished drying showed a basis weight of 10.9 kg. per 120.8 square meters.

The wet mat (on the Fourdrinier) after passing the suction boxes under the leaving end of the Fourdrinier screen continued onto an endless belt conveyor (a 112 by 84 mesh screen) also at 15.24 MPM. Then after about 1.5 meters beyond that end of the Fourdrinier, the wet mat (on that conveyor) passed about 10 cm. below a battery (about 60.5 cm. long) of infrared lamps (52.4 kilowatts, at 3.8 amperes, 480 volts, single phase 60 cycle) for about 2.4 seconds.

The partially dry web continued through a tunnel dryer (about 3.67 meters long by 1.83 meters wide) providing a temperature of about 121° C. and then alternated in sequence over one and then under the next of each of a series of six dryer drums (the first drum providing a temperature of 121° C. with the temperature increased at each of them that followed with the last drum maintained at 127° C.). The finally dry mat then passed through a pair of tension rollers and onto a wind up drum. That dry mat web with a smooth surface on each side wound up easily around that drum without any tears or wrinkles.

The finished gas-vapor treating web showed a porosity value (by Gurley porosity meter) of about 21.3 liters per minute (i.e. LPM) per square decimeter (i.e. sq. dcm.) of surface at a test differential air pressure of 1.77 centimeters of water (gage).

Based on the starting amounts of the essential materials, the finished dry gas-vapor treating mat contains about 3.84% of the cobeat (having equal parts of cotton cellulose fibers and of micro-bits) and about 96.16% of glass fibers.

The air filter furnish of Example 3 includes sufficient cobeat to enable relying on part of the cobeat to serve as the binding agent to maintain the physical continuity of the filter mat composed of solely cobeat and the mixed micro-fibers.

Another embodiment of the filter mats including an agent to enhance the wet strength of the web leaving from the Fourdrinier screen and a separate binding agent replacing part of the cobeat (used in Example 3) is prepared by including an agent to enhance the web wet strength and a separate added organic binder for the replaced part of the cobeat, as illustrated in, but not restricted to, the following example:

EXAMPLE 4

Air Filter With Added Wet Strength On Leaving The Fourdrinier And Different Binder Example 3 is repeated, but (i) in each of the two separate inclusions of its 2.27 kilos of cobeat of equal parts of cotton cellulose fibers and polystyrene micro-bits part of the cobeat is replaced by an added organic binder-containing cobeat composed of 1.06 kilos of each of the cotton fibers and the micro-bits and 0.15 kilo of the earlier above described readily water-dispersible, semi-dull, optically whitened polyethylene terephthalate polyester having a special finish compatible with anionic, cationic or nonionic binders and non-shrinkable in boiling water, and (ii) when the second 2.27 kilos of this binder-containing cobeat is admixed in the second portion of 3000 liters of water in the pulper, there is also admixed 0.91 kilo of fibers of the 98% hydrolyzed polyvinyl alcohol as added binder.

With those two changes the rest of Example 3 is repeated herein without change with the further occurrence that when the wet web that left the Fourdrinier was passed under the battery of infrared lamps, the exposure of the web to the temperature from those lamps for about 2.4 seconds quickly caused solution of the polyvinyl alcohol and with its resulting solution tending to accumulate at the intersections between the intermixed fibers and cobeat.

The resulting mat was 0.46 millimeter thick with basis weight of 10.45 kilos per 120.9 square meters, tensile strength in the machine direction of 0.736 kilo per cm. and in the cross direction 0.693 kilo per cm. and Gurley porosity value of about 2,133 LPM per square meter at a pressure differential of 1.77 cm. of water (gage).

The finished air filter mat contains about 4.24 kilos of cobeat (of equal parts of the cotton fibers and micro-bits), of 0.3 kilo of the polyethylene terephthalate polyester (included to enhance the web's wet strength on leaving the Fourdrinier), about 0.91 kilo of polyvinyl alcohol and 113.5 kilos of glass fibers.

This modified cobeat used in Example 4 is prepared in the same way as the cobeat of Example 1 was prepared except that with using equal weights (on dry basis) of the cellulose cotton fibers and the micro-bits there is included the earlier above described polyester (e.g., the TREVIRA polyester) to the extent of 7% of the total weight of cotton fibers and micro-bits.

In the production of the air filter mats of the invention for some uses, it is desirable under the production conditions, as in Example 4, for the wet web leaving the Fourdrinier to have added wet strength. That is accomplished by using in the furnish the cobeat modified by including fibers of a terephthalate polyester to the extent of no more than 7% of the total weight of the cellulose fiber and the micro-bits. That modification is illustrated by, but not limited to, the following:

EXAMPLE 5

Minimum Air Filter With Added Polyester Fibers

Example 3 is repeated except for replacing each of its two separate inclusions of 2.27 kilos of its cobeat in each case by 2.27 kilos of the polyester-containing cobeat used in Example 4, i.e. by each 2.27 kilos of this modified cobeat containing 1.06 kilos of each of the cellulose fibers and the micro-bits and 0.15 kilo of the TREVIRA polyethylene terephthalate polyester.

EXAMPLE 6

Minimum Air Filter With Added Organic Binder (a) Example 3 is repeated except for including with its second addition of the 2.27 kilos of cobeat composed of the cellulose fibers and polystyrene micro-bits 0.19 kilo of the 98% hydrolyzed polyvinyl alcohol fibers. The resulting finished air filter mat contains 3.82% of the cobeat, 0.77% of the polyvinyl alcohol, and 95.41% of the mixed glass micro-fibers (b) Part (a) of this example is repeated except for using 2.12 kilos of cobeat in place of each of the two separate additions of 2.27 kilos of cobeat. The resulting filter contained 3.57% of cobeat, 0.77% of polyvinyl alcohol and 95.06% of mixed glass micro-fibers.

The 98% hydrolyzed polyvinyl alcohol used in Examples 4 and 6 was used in its presently more commonly available form of fibers (about 0.635 cm. long), but may be used in powder form or otherwise.

In any of the examples, the content of the sodium hexametaphosphate (ordinarily included to enhance glass fibers dispersion) can be reduced in any amount even to complete omission for the micro-bits exert dispersing activity on the glass fibers. The content of sulfuric acid can be reduced so long as the pH of the suspension is below 7 and particularly 6 and lower and at least 2.5 and better between 3 and 6.

The polystyrene micro-bits used in any of the examples can be replaced in part or as a whole by micro-bits of any of the other applicable expandable thermoplastic styrene-polymers or of expanded lower polyolefins or of flexible polyurethane, each of them havng been non-brittle in their initial expanded form. In each of the examples and any of the just above indicated modifications of any of them, the micro-bits were provided along with the amount of water held by them because of their ready availability and lower cost as such. They also could be used in any dry state.

Also, the cotton cellulose fibers included in preparing the cobeat were used in their form as wet lap cotton fibers because of the economy in so using them. However, that does not preclude using those fibers or any of the other disclosed applicable cellulose fibers in the dry state when thus available or desired for any particular filter mat production.

The polyester fibers used in any of Examples 4 and 5 also can be replaced by any other fiber-forming terephthalate polyester such as the FORTREL polyethylene terephthalate or the KODEL dimethyl 1,4-cyclohexane dimethanol terephthalate.

The quantitative (by weights or percentages) analyses of the air filter mats are given in the examples as if the mats were bone dry, but actually they contain in equilibrium about 1% of moisture.

For some uses of the air filter mats of this invention, for example, when they are to be shaped into some physical formations other than flat, the reforming to the selected shape is benefited by having the filter mat contain still more water, for example, even from about 20% to 40%.

Such mats are prepared with the same proportions of the various constituents of each of Examples 3 through 6 respectively and by the same procedure in each of them except for such changes in the temperature, for example, in any of the battery of infrared lamps, the tunnel dryer and the dryer drums, and in the dwell time in any or all of them as needed to leave the selected final moisture, for example, 20% in the finished roll of web of the respective air filter mat produced. The person of ordinary skill in this art can work out with the particular controls available to him for the equipment used the combination of temperatures and dwell times to use to provide the selected moisture content in the finished filter mat.

To avoid making this specification prolix, each of the modifications of the examples available from the just foregoing possible substitutions is to be considered as if appearing written out in full herein.

While the invention has been explained by detailed description of certain specific embodiments of it, it is understood that various substitutions or modifications can be made in any of them within the scope of the appended claims which are intended to cover also equivalents of these embodiments.

What is claimed is:

1. A filter mat effective to filter air, which comprises in the below respectively indicated proportions to one another
(a) about 250 parts of glass micro-fibers admixed together composed of
  (i) about 50 parts of such fibers about 6,300 microns long and about 4.3 microns in diameter,
  (ii) about 50 parts of such fibers about 1,500 microns long and from about 2.17 to about 3.1 microns in diameter, and
  (iii) about 150 parts of such fibers about 1,000 microns long and from about 0.49 to about 0.58 micron in diameter; all intertwined with
(b) from about 9.35 about 10 parts of a cobeat including (i) from about 4.68 to about 5 parts of cellulose fibers and (ii) from about 4.67 to about 5 parts of micro-bits of an expanded styrene-polymer, of an expanded polyolefin from the group from polyethylene through polymethylpentene or of a flexible polyurethane, the initial expanded form of each of which was non-brittle; and (c) from zero to 2 parts of an organic binding agent distributed substantially uniformly throughout the intermixture of the intertwined cobeat and intermixed glass micro-fibers without destroying the air permeability of the filter, said binding agent (i) being inert to the constituents of the filter mat and to the fluid media that is to contact the mat, (ii) having its binding effectiveness initiated by heat, and (iii) being selected from (x) such binder insoluble in cold water and soluble in hot water and (y) any of the aqueous acrylic emulsions and polyvinyl chloride emulsions used as binders, and each of which binders (x) and (y) retains its binding function on cooling.

2. A filter mat as claimed in claim 1, which is free of its organic binding agent (c).

3. A filter mat as claimed in claim 1, which contains a fiber-forming terephthalate polyester to the extent that the total of said polyester and the cobeat content of the mat is less than 7% of the total of the cobeat and glass micro-fibers in the mat.

4. A filter mat as claimed in claim 1, containing up to about 2 parts of its organic binder agent (c).

5. A filter mat as claimed in claim 4, which contains a fiber-forming terephthalate polyester to the extent that the total content of said polyester, the cobeat and said organic binder agent in the mat is less than 7% of the total solids content of the mat.

6. A filter mat as claimed in claim 5, wherein the micro-bits in the cobeat are polystyrene, the organic binder agent is 98% hydrolyzed polyvinyl alcohol present in the amount of about 2 parts, and the fiber-forming terephthalate polyester is the readily water dispersible, semi-dull, optically whitened polyethylene terephthalate polyester having a finish compatible with anionic, cationic and nonionic binders and non-shrinkable in boiling water and present in an amount equal to about 7% of the cobeat content of the mat.

7. A filter mat as claimed in claim 6, which includes a water repellant which is a cationic perfluoroalkyl acrylate copolymer with said alkyl group having from 6 to 10 carbons and said repellant being present in an amount sufficient at least to provide a practical level of water repellance and such that the total of the repellant and any other organic content of the mat is less than 7% of the mat content.

8. A filter mat as claimed in claim 1, wherein the micro-bits in the cobeat are a polyolefin.

9. A filter mat as claimed in claim 1, wherein the micro-bits are a flexible polyurethane.

10. A filter mat as claimed in claim 1, which includes also a water dispersible cationic organic water repellant inert to the constituents of the mat and ineffective against its necessary porosity and tensile strength and in an amount sufficient at least to provide a practical level of water repellance and such that the total of the repellant and any other organic content of the mat is less than 7% of the mat content.

11. A filter mat as claimed in claim 10, wherein the water repellant is a cationic perfluoroalkyl acrylate copolymer wherein the alkyl group has from 6 to 10 carbons.

* * * * *